US006895447B2

United States Patent
Brewer et al.

(10) Patent No.: US 6,895,447 B2
(45) Date of Patent: *May 17, 2005

(54) METHOD AND SYSTEM FOR CONFIGURING A SET OF WIRE LINES TO COMMUNICATE WITH AC OR DC COUPLED PROTOCOLS

(75) Inventors: James Brewer, Leander, TX (US); William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 421 days.

This patent is subject to a terminal disclaimer.

(21) Appl. No.: 10/164,041

(22) Filed: Jun. 6, 2002

(65) Prior Publication Data

US 2003/0229739 A1 Dec. 11, 2003

(51) Int. Cl.$^7$ .......................... G06F 3/00; G06F 13/12; G06F 13/36
(52) U.S. Cl. .................... 710/11; 710/63; 710/315
(58) Field of Search ................ 710/314–316, 710/305–306, 11, 63, 105

(56) References Cited

U.S. PATENT DOCUMENTS

| 5,832,244 | A | * | 11/1998 | Jolley et al. ............... 710/305 |
| 5,842,045 | A | * | 11/1998 | Nakamura .................... 710/63 |
| 5,918,016 | A | | 6/1999 | Brewer et al. ........... 395/200.5 |
| 6,023,587 | A | | 2/2000 | Watts, Jr. et al. ........... 395/892 |
| 6,038,400 | A | * | 3/2000 | Bell et al. ...................... 710/11 |
| 6,073,201 | A | * | 6/2000 | Jolley et al. ................. 710/315 |
| 6,119,186 | A | | 9/2000 | Watts et al. ................. 710/104 |
| 6,206,480 | B1 | | 3/2001 | Thompson .................. 301/625 |
| 6,256,700 | B1 | | 7/2001 | Sauber ........................ 710/129 |
| 2002/0188782 | A1 | | 12/2002 | Fay ............................ 710/110 |
| 2003/0046472 | A1 | * | 3/2003 | Morrow ...................... 710/305 |
| 2003/0229748 | A1 | | 12/2003 | Brewer et al. .............. 710/305 |
| 2003/0233507 | A1 | * | 12/2003 | Yu et al. ..................... 710/310 |

\* cited by examiner

*Primary Examiner*—Glenn A. Auve
*Assistant Examiner*—Nimesh Patel
(74) *Attorney, Agent, or Firm*—Hamilton & Terrile, LLP; Robert W. Holland

(57) ABSTRACT

A universal bus communicates information by one of plural bus protocols. A bus protocol selector is operable to select one of the plural bus protocols associated with a device interfaced with an information handling system and to communicate information over the bus with the selected bus protocol. An Input/Output chip includes a protocol selector unit that selects a bus protocol I/O unit to communicate with the device over the universal bus. The bus protocol I/O unit communicates over the universal bus by using a bus protocol that is compatible with the device. For instance, the one of plural available differential serial bus protocols is selected so that the bus protocol I/O unit communicates with the device using a bus protocol compatible with the device. In some instances, a bypass circuit configures the physical characteristics of the universal bus, such as by interfacing or removing a capacitor with the universal bus to support AC or DC coupled bus protocols.

28 Claims, 3 Drawing Sheets

METHOD AND SYSTEM FOR CONFIGURING A SET OF WIRE LINES TO COMMUNICATE WITH AC OR DC COUPLED PROTOCOLS

BACKGROUND OF THE INVENTION

1. Field of the Invention

The present invention relates in general to the field of information handling systems, and more particularly to a method and system for information handling system bus data transfers with multiple protocols on a set of wirelines.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to improve the interoperability of information handling systems with each other and with other devices, manufacturers have collaborated to develop standards for transferring information over busses. For instance, bus protocol standards define how signals are sent across wire line traces so that devices made by different manufactures may communicate with each other and with information handling systems made by different manufacturers. The bus protocol standards ensure the interoperability of external devices that connect with sockets typically located at the back of an information handling system and the interoperability of internal devices that connect with sockets typically configured as card slots. For example, common external devices include monitors, printers, scanners and audio systems which connect to sockets for common use, such as Universal Serial Bus (USB) sockets, or which connect to sockets for specialized use, such as graphics card socket connectors that extend from a graphics card inserted into a slot. Common internal devices include storage devices such as hard drives, floppy drives, CDROM drives, random access memory (RAM), and host adapters for connecting bus to bus, e.g. a PCI to 1394 host adapter. Common bus protocols include USB, Infiniband, 1394, 3GIO (PCI Express), Serial Advanced Technology Attachment (SATA) and Serial Attached SCSI.

One difficulty with communicating information through busses is that information handling system motherboards generally are designed to include separate wire line traces and connectors for each supported bus protocol. Thus, the greater number of supported protocols, the more complex the motherboard design. One simplification for motherboard design is reliance on serial busses, which use an embedded clock to send bits of information sequentially across a line, instead of parallel busses which use a separate strobe line to send bits simultaneously across separate lines. Reliance on serial busses has increased with the increased data transfer rates available with differential busses that use separate lines to send positive and negative signals. A differential serial bus transfers data at rates comparable to or better than a parallel bus while using less traces, thus improving information handling system performance with reduced motherboard complexity.

Although high speed differential serial busses generally use the same design layout rules, separate line traces are typically required for each bus protocol since each protocol sends unique signals. Further, each bus protocol typically has a unique form factor so that incompatible devices cannot connect with a given bus protocol socket. Thus, for each bus protocol supported by an information handling system, the motherboard design typically includes separate sets of routed wire lines and separate connectors. Manufacturers generally include a number of different bus protocols in an information handling system to increase compatibility with devices. However, the greater the number of supported protocols, the greater the number of wire lines and connectors needed to support the protocols resulting in greater expense and complexity.

SUMMARY OF THE INVENTION

Therefore a need has arisen for a method and system which supports a variety of bus protocols with reduced complexity.

A further need exists for a method and system which combines multiple busses on one set of wire lines with a universal form factor for device connection.

A further need exists for a method and system which configures a wire line electrical characteristics to support multiple bus protocols.

In accordance with the present invention, a method and system are provided which substantially reduce the disadvantages and problems associated with previous methods and systems for transferring information through an information handling system. A bus protocol selector communicates with devices over a bus using one of plural bus protocols. The bus protocol selector transfers information with a protocol associated with a device by configuring the bus connected with the device to use the selected bus protocol More specifically, an information handling system includes a bus protocol selector configured as an Input/Output (I/O) interface chip with plural bus protocol I/O units. Each bus protocol I/O unit has logic to communicate information with a device by using a bus protocol. The bus protocol I/O units interface with a protocol selector unit that, in turn, interfaces over a universal bus to a universal protocol socket. The protocol selector unit configures the universal bus to communicate with the desired bus protocol by connecting the universal bus with a bus protocol I/O unit associated with the desired protocol. For instance, the protocol selector unit includes a switch that switches between plural bus protocol I/O units so that a bus protocol I/O unit associated with a desired bus protocol connects with the universal bus. In one embodiment, a protocol identification unit associated with the universal protocol socket identifies the protocol associated with a device interfaced with the socket and provides the identification to the protocol selector unit to identify the bus protocol I/O unit by the selected bus protocol.

In one embodiment, the protocol selector unit selects from differential serial bus protocols that use one or two differential wire line pairs to communicate information. The protocol selector unit interfaces with one or more bus protocol I/O units for each of the available differential serial bus protocols, with the wire line interfaces using the same general routing guidelines and layout ground rules. The universal protocol socket connects with devices that use each type of protocol, either by including connection points for each type of protocol form factor or by interfacing with an adapter that converts a protocol form factor to a universal form factor. In addition, the bus protocol I/O units support sockets with direct interfaces to provide a dedicated protocol connection for the protocol associated with the bus protocol I/O unit. Thus, a user may connect a device with a predetermined protocol to either a universal protocol socket that allows selection of the device's protocol or to a non-selective socket dedicated to the device's protocol.

In another embodiment, the electrical characteristics of a bus are configured to support bus protocols with different physical requirements. For instance, serial bus wire lines transmit signals either with alternating current (AC) coupling that generally requires capacitive or DC isolation or with direct current (DC) coupling that generally requires a shorted connection. A bypass circuit associated with the universal bus configures the electrical characteristics of the bus to conform with either AC or DC coupled bus protocols by selectively interfacing electrical components with the universal bus. For instance, the bypass circuit brings a capacitor in line with the universal bus if an AC coupled protocol is in use and brings the capacitor off line if a DC coupled protocol is used. Additional switches may be used to configure the universal bus for additional AC coupled protocols with additional switches bringing electrical components on line with the universal bus to configure the bus for different physical requirements of different AC coupled protocols. The universal bus may default to an open circuit to bring the capacitor in line and protect a more sensitive AC couple bus protocol I/O unit or may default to a closed position to allow DC biased functions such as identification of devices inserted in the universal socket.

The present invention provides a number of important technical advantages. One example of an important technical advantage is that I/O chips minimize their I/O signal/pin count by supporting multiple busses through the same off-chip I/O lines, reducing the number of routed lines through the motherboard. The use of a single set of wire lines to support multiple bus protocols reduces motherboard design complexity and cost. The convergence of different bus types onto a single set of card-routed lines makes routing easier and reduces the number of connectors supported in a system by allowing one socket to communicate by multiple bus protocols. For instance, two or more differential serial bus protocols may be used to transfer information over the same set of wires, including USB, Infiniband, 1394, 3GIO and Serial ATA. Further, protocols in development, such as Serial Attached SCSI, and future protocols may be added to an existing set of wires by selectively interfacing the wires with logical units for the desired protocol.

Another example of an important technical advantage of the present invention is that I/O devices communicate with a single form factor. For instance, a number of bus protocols are supported over a single socket, either through a direct connection or an adapter, with the protocol associated with the device automatically selected for the bus to use to communicate with the device. A user is thus able to connect a device to an information handling system without the confusion of determining the type of protocol associated with the device. Further, dedicated busses provide sockets with protocol-specific form factors in addition to uniform protocol sockets.

Another example of an important technical advantage of the present invention is that both AC and DC coupled protocols are supported with the same wire lines to allow more simple wiring and routing of high speed signals and reduced cost due to a reduced number of communication channels. The bypass circuit configures a universal bus for protocol specific electrical characteristics, such as by interfacing a capacitor in line with the universal bus to support AC coupled protocols and removing the capacitor from the universal bus to support DC coupled protocols. Thus, the bypass circuit allows a single set of wire lines to support bus protocols with different physical characteristics.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling systems interact with a large variety of devices, both external and internal, by communicating data with the devices through a variety of defined protocols. In order to accommodate different types of protocols without confusing users, information handling systems typically include sockets having a form factor for each protocol so that users are generally only able to interface devices using a predetermined protocol through a socket having an associated form factor. The present invention provides a capability for a universal form factor for plural protocols by supporting different protocols over a single information handling system bus. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display.

The information handling system may also include one or more buses operable to transmit communications between the various hardware components.

Figure 1:
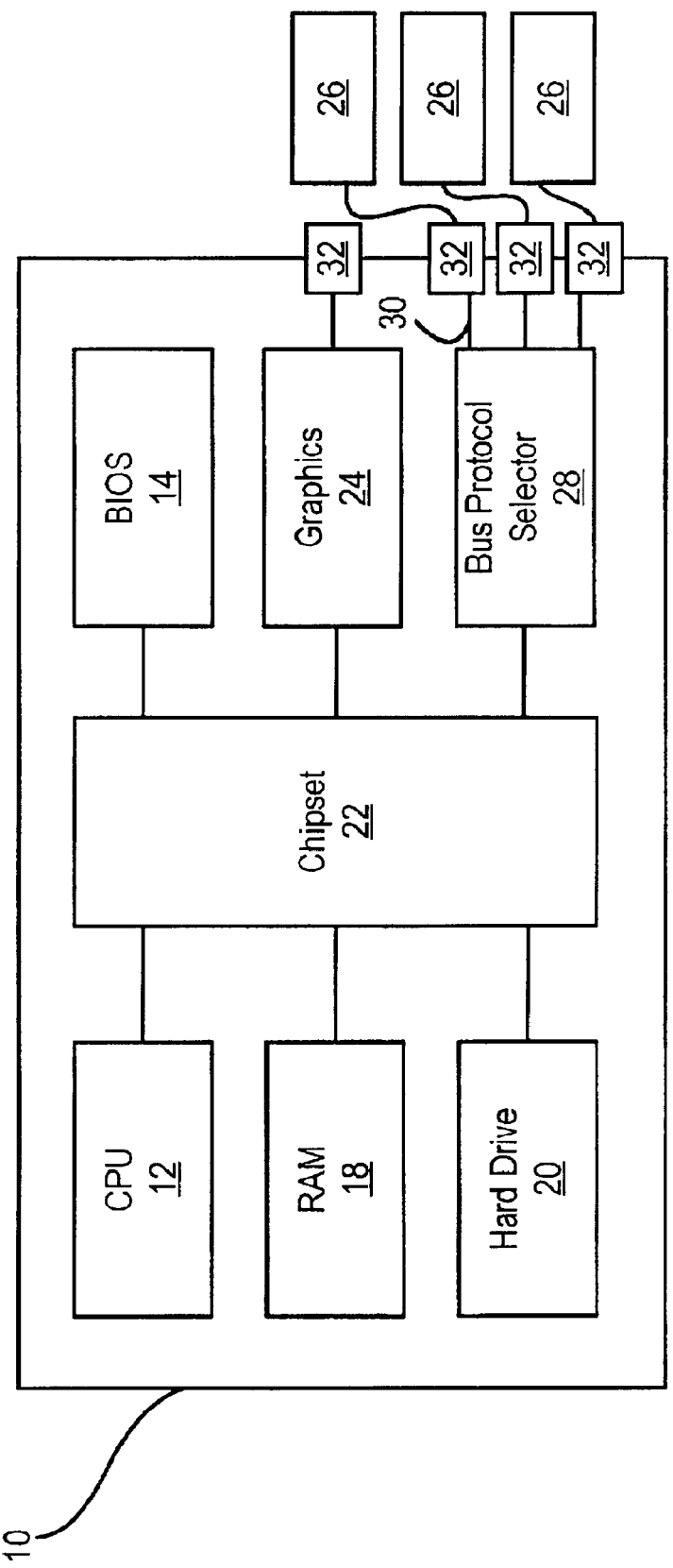
FIG. 1 a block diagram of an information handling system with a universal bus.

Referring now to FIG. 1, a block diagram depicts a simplified architecture for an information handling system 10 configured to transfer data with external devices using different protocols. Information handling system 10 runs applications on CPU 12, such as an operating system which coordinates operation of hardware devices through a BIOS 14 and a chipset 22. For instance, applications running on CPU 12 use RAM 18 and hard drive 20 to store information, a chipset 22 to communicate information with various hardware devices, and a graphics controller 24 to display information through a monitor.

Information handling system 10 communicates with devices 26 through a bus protocol selector 28 that selects one of plural bus protocols for communicating information with devices 26. When a device 26 interfaces with bus protocol selector 28, the bus protocol that the device uses to communicate information is determined and bus protocol selector 28 configures the bus 30 to communicate information according to the determined bus protocol. For instance, a USB device 26 interfaces with a socket 32 to communicate information over bus 30, through bus protocol selector 28 and chipset 22 to CPU 12. Socket 32 communicates the identity of device 26 as a USB device to bus protocol selector 28, which configures bus 30 to communicate with the USB protocol. Bus protocol selector 28 is configurable to select a variety of bus protocols, including Infiniband, 1394, 3GIO (also known as PCI express) and SATA, and adaptable for addition of new protocols such as Serial Attached SCSI. Although FIG. 1 depicts external devices interfaced with information handling system 10 through connector sockets 32, in alternative embodiments, internal devices and other types of sockets, such as slots for cards, may be selected.

Figure 2:
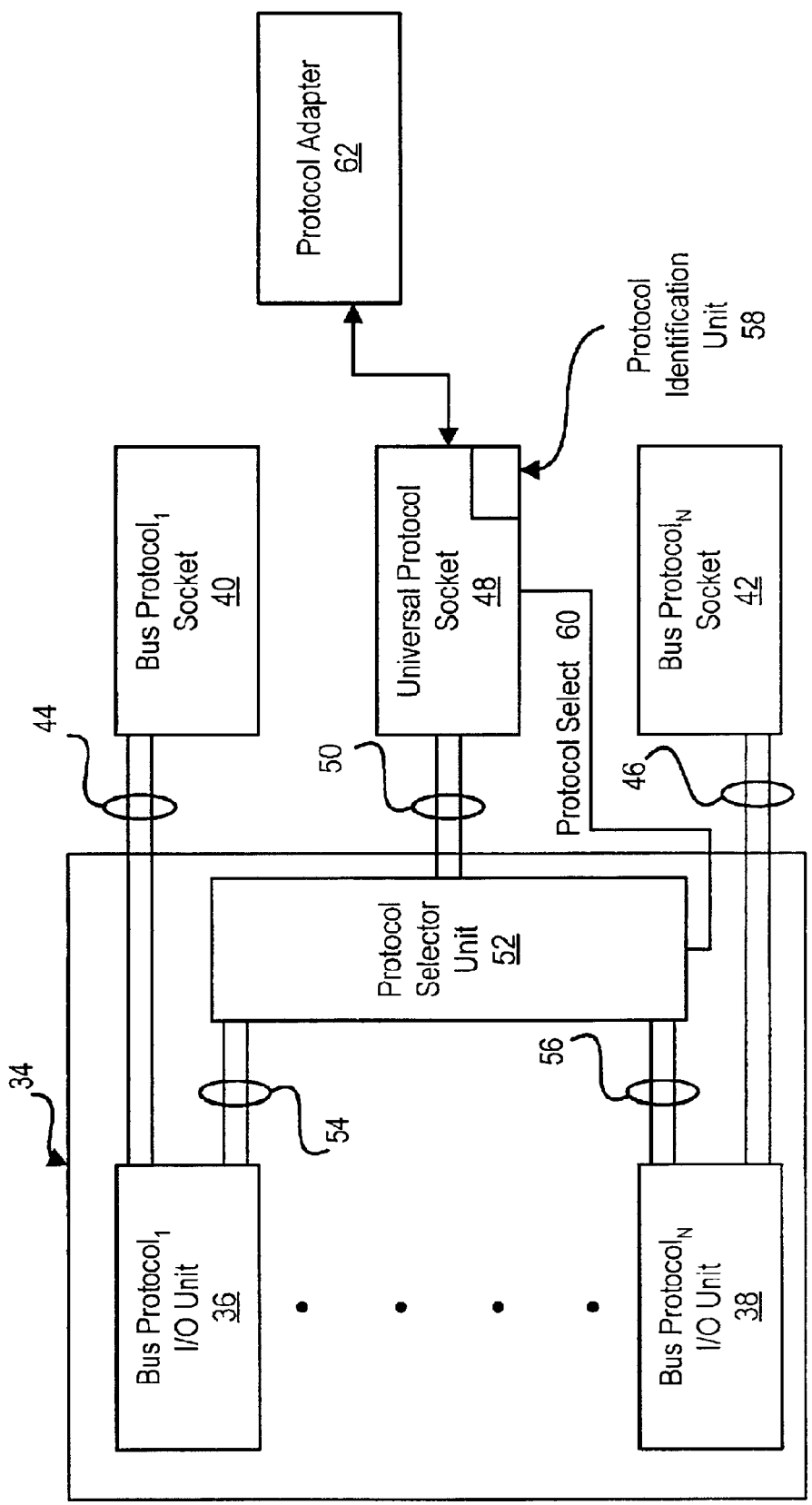
FIG. 2 depicts a block diagram of an Input/Output interface chip with for communicating with plural bus protocols over a single set of bus wires.

Referring now to FIG. 2, a block diagram depicts a bus protocol selector system 34 configured as an I/O interface chip 34. Plural bus protocol I/O units 36 and 38 each include logic for communicating information by using an associated bus protocol. For instance, bus protocol I/O unit 36 supports USB protocol to communicate with a bus protocol socket 40 having a USB form factor with the communication transferred over a differential serial bus 44. Similarly, bus protocol I/O unit 38 supports SATA protocol to communicate with a bus protocol socket 42 having a SATA form factor with the communication transferred over a differential serial bus 46. Thus, bus protocol socket 40 is a dedicated USB connector and bus protocol socket 42 is a dedicated SATA connector, each having an appropriate form factor to prevent user confusion regarding the devices that are appropriate for the bus. Information received from devices is translated by bus protocol I/O units 36 and 38 for transfer through chipset 22 of information handling system 10.

A universal protocol socket 48 allows selection of the protocol used to transfer information between information handling system 10 and a device that may use one of plural bus protocols. A bus 50 interfaces universal protocol socket 48 with a protocol selector unit 52. Protocol selector unit 52 determines the selected protocol and interfaces bus 50 with a bus protocol I/O unit associated with the selected protocol. For instance, bus protocol I/O unit 36 interfaces with protocol selector unit 52 over bus 54 with USB protocol and bus protocol I/O unit 38 interfaces with protocol selector unit 52 over bus 56 with SATA protocol. Protocol selector unit 52 switches bus 50 to connect with bus 54 if a USB device is interfaced with universal protocol socket 48, and switches bus 50 to connect with bus 56 if a SATA device is interfaced with universal protocol socket 48. A protocol identification unit 58 detects the type of protocol associated with the device interfaced with universal protocol socket 48 and communicates the protocol type through protocol select line 60 to protocol selector unit 52. In alternative embodiments, three or more protocols are supported by universal protocol socket 48 by interfacing bus protocol I/O units associated with the desired protocols to protocol selector unit 52 so that, if a device interfaces with universal protocol socket 48, protocol selector unit 52 switches to a bus protocol I/O unit associated with protocol of the device. Protocol identification unit 58 may be as simple as a pin on the connector which is driven by protocol adapter 62 to a logic "1" or "0" to indicate selection of one of two bus protocol I/O units 36 or 38. Alternatively, it may be two or more pins to indicate multiple bus protocol I/O units.

One advantageous use of the present invention is to combine multiple serial bus protocols on a single set of wire lines. High speed differential serial I/O busses use similar design layout ground rules to transmit information with either a single pair of wire lines, one positive wire line and one negative wire line, or two wire line pairs. For instance, USB uses one differential wire line pair compared with Infiniband, 1394, 3GIO and SATA which each use two differential wire line pairs as well as Serial Attached SCSI which tentatively will use two differential wire line pairs. However, to prevent users from connecting devices with incompatible connector sockets, each protocol uses a distinct form factor. Universal protocol socket 48 accepts connectors having different types of associated protocols with a universal form factor. For instance, universal protocol socket 48 may include USB and SATA socket connection points so that a connector with either USB or SATA connector pins is accepted. Alternatively, a protocol adapter 62 connects at one end to universal protocol socket 48 and to the other end to a connector of a device having a compatible protocol. In this manner, a single set of routed lines, bus 50, to run through a motherboard and support multiple protocols, thus reducing line routing design problems.

The use of a single set of routed lines as a bus for plural serial protocols is convenient since the serial protocols generally use similar motherboard traces of one or two differential lines pairs and an embedded clock. However, serial protocols use both direct current coupling and alternating current coupling. An AC coupled line typically uses a capacitor in line with the signal to provide some noise immunity and to help with common mode biasing. A DC coupled line is less expensive, since no capacitor is used, and allows one side of the bus to monitor a DC bias created by the other side to enable basic functions, such as determining the presence of a device. Having both a DC coupled and AC coupled bus protocol in use on the same bus wire line presents a difficulty since the DC coupled protocol requires a shorted connection and the AC coupled protocol requires capacitive or DC isolation.

Figure 3:
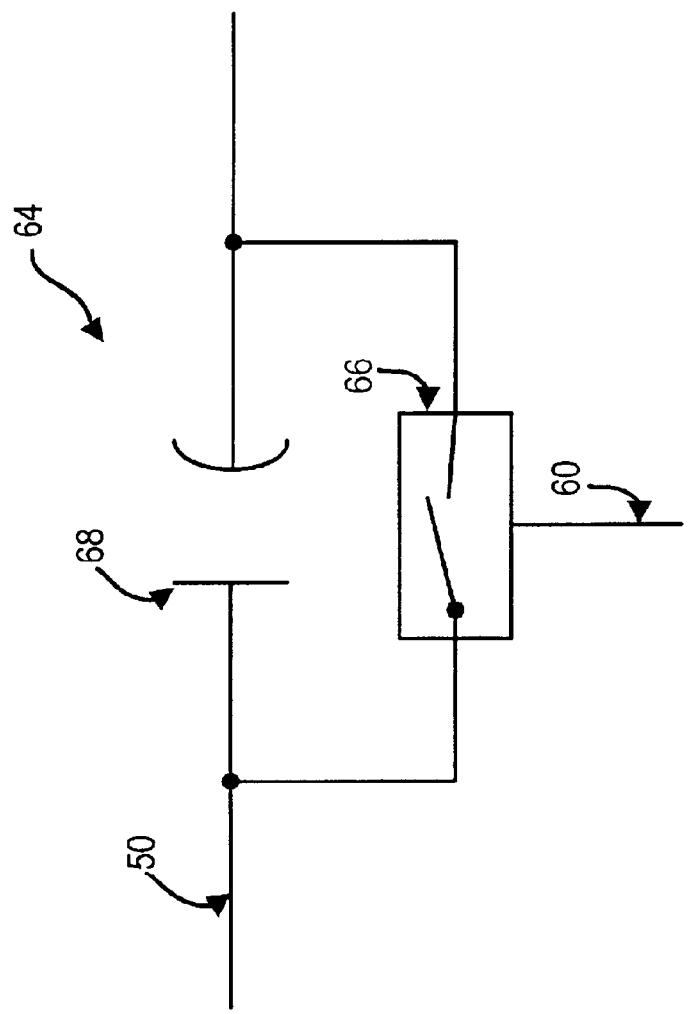
FIG. 3 depicts a circuit diagram of a bypass circuit for communicating AC and DC coupled bus protocols over a single set of bus wires.

Referring now to FIG. 3, a circuit diagram depicts a bypass circuit 64 operable to adapt a wire line to support a DC coupled or an AC coupled bus. For instance, bus line 50 traverses a motherboard to support plural bus protocols. A bus protocol selector transmits signals by a DC or AC coupled protocol, such as in response to a protocol selection signal sent across protocol select line 60. Protocol select line 60 also signals bypass circuit 64 to open or close a bypass switch 66 that places a capacitor 68 on or off line from bus line 50. If an AC coupled protocol, such as 3GIO and in some cases Infiniband, Serial ATA and Serial Attached SCSI, is selected, bypass switch 66 opens to place capacitor 68 in the path of signals traversing bus 50. If a DC coupled protocol, such as USB or 1394 and in some cases Infiniband, Serial ATA and Serial Attached SCSI, is selected, bypass switch 66 closes to remove capacitor 68 from the path of signals traversing bus 50. Protocol identification is used to control the switch.

In one embodiment, bypass switch 66 is a fast acting FET switch with low impedance. The FET switch is driven by a high voltage source, such as 12 volts, to ensure low resistance so that signals are not excessively degraded. Bypass circuit 66 biases to a default position of an open switch for AC coupled signals to reduce the probability of damage occurring to more sensitive DC coupled circuits. A bypass switch 66 is included along each wire line of a bus, such as each wire of a differential pair for a two wire USB bus or each of the four wires for a two differential pair PCIE (or PCI Express) bus. In specific protocol applications, the electrical characteristics of bus 50 are modified to meet protocol specifications by bringing appropriate electrical devices in line with bus 50. For instance, a wire line that transmits with three protocols may have three separate bypass switches, each bypass switch bringing on line electrical devices to configure the electrical characteristics of the wire line for a desired bus protocol. In an alternative embodiment, bypass switch 66 biases to a default position of a closed switch to allow DC bias detection for providing additional adapter information such as signaling speed on USB.

One important advantage to the present invention is the reduction in cost and complexity for motherboard wire line trace design by using the same trace for sending signals having different types of protocols. Two or more different types of protocols are supported with selective transmission through the wire lines to a desired bus protocol I/O unit and selection of wire line electrical characteristics with activation of a desired bypass circuit to place or remove electrical devices in line with the wire line. The configuration of the bus protocol I/O units and protocol selector unit, such as within a chip, and the location of the bypass circuit along the bus between the bus protocol I/O unit and the socket, may be altered as needed to adapt to specific motherboard constraints. For instance, wire line trace routing and connectors are reduced in number and complexity while nonselective, protocol specific wire line traces and connectors are also supported. Another important advantage is the ability to match coupling requirements for identical bus protocols. For example, AC or DC coupled SATA adapters could be accommodated on one Protocol socket.

Although the present invention has been described in detail, it should be understood that various changes, substitutions and alterations can be made hereto without departing from the spirit and scope of the invention as defined by the appended claims.

What is claimed is:

1. An information handling system comprising:
   a CPU operable to perform instructions to interact with devices;
   a socket operable to interface with a device, the device having one of an AC coupled bus protocol or a DC coupled bus protocol;
   a bus interfaced with socket; and
   a bypass circuit interfaced with the bus, the bypass circuit interfacing a capacitor with the bus for a device having an AC coupled bus protocol and removing the capacitor from the bus for a device having a DC coupled bus protocol.

2. The information handling system of claim 1 wherein the socket has a form factor associated with a predetermined bus protocol, the predetermined bus protocol having either an AC coupled or a DC coupled interface.

3. The information handling system of claim 2 wherein the AC coupled bus protocol and the DC coupled bus protocol comprises SATA.

4. The information handling system of claim 1 wherein the bus comprises a differential serial bus having one or more differential wire pairs, each wire of the wire pair having a bypass circuit.

5. The information handling system of claim 1 wherein the AC coupled bus protocol comprises one or more of the protocols selected from the group of Infiniband, 3GIO, serial attached SCSI and SATA.

6. The information handling system of claim 1 wherein the DC coupled bus protocol comprises one or more of the protocols selected from the group of USB, Infiniband, 1394, and SATA.

7. The information handling system of claim 1 wherein the bypass circuit defaults to an AC coupled bus with the capacitor interfaced with the bus.

8. The information handling system of claim 1 wherein the bypass circuit defaults to a DC coupled bus with the capacitor isolated from the bus, the bypass circuit monitoring the bus for DC bias introduced at the socket.

9. The information handling system of claim 1 further comprising:
   a bus protocol selector interfaced with the bus and the CPU, the bus protocol selector operable to select one of plural bus protocols associated with the device and to communicate information over the bus with the selected bus protocol.

10. The information handling system of claim 9 wherein the bus protocol selector comprises:
    a first bus protocol I/O unit operable to interface with the bus using a first bus protocol;
    a second bus protocol I/O unit operable to interface with the bus using a second bus protocol; and
    a protocol selector unit interfaced with the first and second bus protocol I/O units and the bus, the protocol selector unit operable to interface the bus with the first bus protocol I/O unit to communicate with a device using the first protocol and to interface the bus with the second bus protocol I/O unit to communicate with a device using the second protocol.

11. The information handling system of claim 10 wherein the protocol selector unit comprises a switch operable to selectively connect the first or second bus protocol unit with the bus.

12. The information handling system of claim 1 further comprising a protocol identification unit associated with the socket and in communication with the bypass circuit, the protocol identification unit determining the protocol of a device associated with the socket as AC coupled or DC coupled and communicating the determined protocol to the bypass circuit.

13. A system for configuring physical characteristics of a bus for operating with plural protocols, the system comprising:
    a bus comprising one or more wire lines;
    plural bus protocol I/O units, each bus protocol I/O unit operable to interface with the bus using one of plural bus protocols, the bus protocols comprising at least one AC coupled protocol and one DC coupled protocol; and
    a bypass circuit interfaced with the bus, the bypass circuit operable to configure the physical characteristics of the bus for sending AC coupled or DC coupled bus protocols.

14. The system of claim 13 further comprising a socket interfaced with the bus, the socket operable to accept a device communicating with one of the plural bus protocols.

15. The system of claim 14 further comprising:
a protocol selector unit interfaced with the bus protocol I/O units and the bus, the protocol selector unit operable to select one of the plural bus protocols for the bus by interfacing the bus with a bus protocol I/O unit associated with the selected one of the plural protocols; and
a bus protocol identification unit associated with the socket and operable to communicate the protocol associated with the device to the protocol selector unit and to the bypass circuit.

16. The system of claim 15 further comprising an adapter associated with the socket for adapting the socket to the form factor of the protocol associated with the device.

17. The system of claim 13 wherein the bypass circuit further comprises:
a capacitor associated with the bus and operable to support an AC coupled protocol; and
a switch operable to selectively interface the capacitor with the bus if the AC coupled protocol is selected and to disconnect the capacitor from the bus if a DC coupled protocol is selected.

18. The system of claim 17 wherein the DC coupled protocol comprises USB and the AC coupled protocol comprises 3GIO.

19. A method for configuring an information handling system bus for communication with a protocol, the method comprising:
interfacing a device with a socket of the bus, the device communicating with a bus protocol;
identifying the device bus protocol;
determining that the device bus protocol comprises a first or a second device bus protocol; and
selectively interfacing a capacitor with the bus based on the determined device bus protocol; and
communicating with the device over the bus.

20. The method of claim 19 further comprising:
interfacing plural bus protocol I/O units with the bus, each bus protocol I/O unit communicating information over the bus with an associated bus protocol; and
activating a switch to connect the bus protocol I/O unit associated with the identified device bus protocol to the bus and disconnect the remaining bus protocol I/O units from the bus.

21. The method of claim 20 wherein activating a switch to connect the bus protocol I/O unit further comprises:
identifying the bus protocol at the socket; and
communicating the bus protocol identification from the socket to the switch.

22. The method of claim 20 further comprising:
interfacing a non-selectable socket to a bus protocol I/O unit with a bus;
interfacing a second device with the non-selectable socket; and
communicating information between the second device and the bus protocol I/O unit with the bus using a predetermined bus protocol associated with the bus protocol I/O unit and the second device.

23. The method of claim 20 further comprising:
interfacing a non-selectable bus with each bus protocol I/O unit, each non-selectable bus operable to communicate only with the bus protocol associated with the interfaced bus protocol I/O unit.

24. The method of claim 19 wherein the first device bus protocol comprises an AC coupled bus protocol and the second device bus protocol comprises a DC coupled bus protocol.

25. The method of claim 24, wherein determining the device bus protocol further comprises;
determining that the device bus protocol comprises an AC coupled bus protocol; and
wherein selectively interfacing a capacitor further comprises interfacing a capacitor with the bus, the capacitor operable to support the AC coupled bus protocol.

26. The method of claim 25, wherein interfacing a capacitor further comprises:
activating a switch to connect the capacitor to the bus between the socket and the bus protocol I/O unit.

27. The method of claim 24, wherein determining the device bus protocol further comprises;
determining that the device bus protocol comprises a DC coupled bus protocol; and
wherein selectively interfacing a capacitor further comprises removing a capacitor interfaced with the bus to support a DC signal from the socket to the bus protocol I/O unit.

28. The method of claim 27, wherein removing a capacitor further comprises activating a switch to disconnect the capacitor from the bus.

* * * * *